made by one stage or two stage processes. In the production of a one-stage copolymer, all the necessary reactants such as phenol, aldehydes, catalysts and the like are charged into a resin kettle and reacted together. Any conventional alkaline catalyst can be utilized and the mole ratio of aldehydes such as formaldehyde to phenol is about 1.25–2.25 to 1. In the two stage process, the resins are made utilizing any conventional acid catalyst and only a part of the necessary aldehyde is added to the kettle utilizing mole ratio of about 0.8 to 1. The rest is added at a later point in time often in the form of hexamethylenetramine, which decomposes in the final curing step, with heat and moisture present, to yield formaldehyde and ammonia; the latter acts as a catalyst for curing.

With respect to the formation of urea type aldehyde copolymer these can generally be formed according to conventional practice once the amine terminated polymer has been reacted with an aldehyde such as formaldehyde. Although the polymerization utilizing urea or melamine will be discussed, generally the other urea type monomers set forth above can be polymerized in a similar manner. Initially, the aldehyde type compound reacts with either urea or melamine first by addition to form methylol compounds and then by condensation in reactions much like those of phenol and formaldehyde. Usually, the production of the amino resins is similar to that of the phenol-aldehyde type resins. The molar ratio of aldehyde to melamine may be from about 1.0–3.0 to 1 whereas for urea the ratio is from about 1.0–1.5 to 1.

The temperature of polymerization are generally from about 90° C. to about 100° C. for phenol-formaldehyde actions and from about ambient temperatures to about 60° C. for urea or melamine-aldehyde reactions. Normally, the only pressure is that generated by the solvent system. Since the urea or melamine type system also tends to produce graft copolymers, the phenol copolymers or the urea copolymers will be branched or crosslinked and therefore very high molecular weights such as from about 50,000 to 300,000 plus will be encountered.

It has been found that the range of the amine polymer constituent such as polybutadiene with either the urea-aldehyde type or phenol-aldehyde type copolymer can range from about 5% to about 95% with from 25% to about 75% being preferred. The amine terminated phenol-aldehyde block copolymer generally has the properties of a thermoset and may be used as molding resins for potting compounds due to their good dielectric properties, as laminating resins, bonding resins, coatings and adhesives and the like. The amine terminated urea-aldehyde type block copolymers may be utilized as molding resins, adhesives, laminating resins and the like. Generally, either type of block copolymer may incorporate various filling and reinforcing agents such as silica, glass, and the like with the urea-aldehyde compounds also often being cellulose filled. Additionally, block copolymers according to the present invention tend to form smoother finishes when the amine terminated constituent is an elastomer such as polybutadiene. Moreover, the phenolic-aldehyde block copolymers are well suited as curatives for contact adhesive formulations, replacing alkyl substituted phenolic curative compounds which are required conventional adhesives.

The invention will be better understood by reference to the following examples.

EXAMPLE XIII

75/25 1,2-Polybutadiene/Urea-Formaldehyde

A two liter resin kettle equipped with a mechanial stirrer, thermometer, nitrogen inlet and distillation head was charged with 294 grams of a hexane cement of amine terminated 1,2-polybutadiene having a molecular weight of about 25,000 (50.6% solids or 150.0 g polymer). One liter of heptane was added and the mixture distilled to remove the hexane and any water present until the vapor temperature reaches approximately 95° C. Upon cooling, an additional 100 milliliters of heptane and 63 milliliters of 37% formalin (25 grams of formaldehyde) as well as 0.5 grams of sodium hydroxide was added. The distillation head was replaced with a Dean-Stark water separator and reflux condenser. The mixture was heated to reflux for about one-half hour and then 25 grams of crystal urea and 25 milliliters of water were added. Reflux was continued for an additional 1½ hours. The mixture was neutralized by the addition of 0.35 milliliters of 85% phosphoric acid (25.15 millimole) and reflux was continued overnight (about 18 hours). The total water removed by azeotropic distillation was 70 milliliters (67.5 milliliters expected from 25 milliliters of water and 63 milliliters of formalin charged). The resin was recovered by precipitation in 1,200 milliliters of isopropanol. The supernatant isopropanol solution was decanted and the polymer was dried in a vacuum for about 60 hours to give 197.1 grams (98.5% yield based upon charged materials). The urea-formaldehyde block copolymer was compounded with wood fiber as follows: 100 parts of block copolymer, 100 parts of wood fiber and 2 parts of Dicup R. Samples were molded and cured in four hours at 270° F. to give the following physical properties: flexural strength of 8,490 psi, flexural modulus of $4.91 \times 10^5$ psi, Izod, notched in foot pounds per inch of 0.65, Izod, unnotched in foot pounds per inch of 2.10, Gardner impact in inch pounds of 2.65 and Rockwell E hardness of 55.

EXAMPLE XIV

25/75 1,2 Polybutadiene-Phenol Formaldehyde Block Copolymer

A 2 l resin kettle was fitted with a turbine agitator, a nitrogen inlet, a thermometer and a reflux condenser. The resin kettle was charged with 500 ml of hexane and 100 g of 1,2 polybutadiene amine terminated polymer (50.6% solids in hexane MW 25,000). This mixture was stirred to dissolve and then 100 ml of formalin (37 wt% or 40 g $CH_2O$ charged) was added. After stirring to mix well, 60 g of sodium hydroxide and 94.1 g of molten phenol were added. The entire mixture was heated with stirring to reflux (63° C.) for 2½ hr. The initial rose-white color faded to a white during the first 30 min. The apparatus was modified by the addition of a Dean-Stark water separator between the resin kettle and the reflux condenser and water was removed by azeotropic distillation. After 3 hr. 1.0 g of DABCO (1,4 Diaza [2.2.2]-bicyclooctane) was added and reflux with water removal was continued. After 19 hrs, 50 ml of water had been removed; the reaction was cooled and 50 ml (20 g $CH_2O$) of formalin was added. The reaction was again heated to reflux and after a total reflux time of 20.5 hr. an additional 1.0 g of sodium hydroxide was added. At the end of 45 hr reflux the total water collected was 115 ml.

PROCESS FOR PRODUCING ACRYLIC RUBBER BY COPOLYMERIZING ACRYLIC ESTER AND MALONIC ACID DERIVATIVE HAVING ACTIVE METHYLENE GROUP

This is a continuation of application Ser. No. 792,391, filed Apr. 29, 1977, now abandoned.

The present invention relates to a process for producing vulcanizable acrylic rubber.

Conventional acrylic rubbers are stable to heat and oilproof because of high polarity of their ester structure, but are unvulcanizable with sulfur because they do not have any unsaturated groups or double bonds in their polymer backbone. Therefore, the conventional process for producing acrylic rubbers is by copolymerizing acrylic esters with a suitable amount of a cross-linking monomer which reacts with a vulcanizing agent such as soaps, ethyltetramines and tetraethylpentamines, and curing the copolymer with such a vulcanizing agent. Such monomers include those which contain halogen such as β-chloroethyl vinyl ether and vinyl chloroacetate, and those which contain an epoxy group such as allyl glycidyl ether, glycidyl acrylate and glycidyl methacrylate.

Such conventional acrylic rubbers are, however, liable to scorch during storage and have low resistance to cold and poor processibility. Particularly, the acrylic rubbers produced by use of liquid polyamine as a vulcanizing agent have undue adhesiveness to a mixing roll, poor bin stability, high corrosiveness, and offensive odor and toxicity coming from the amine.

It is an object of this invention to provide a process of producing vulcanizable acrylic rubber which does not have such disadvantages.

According to the present invention, an acrylic ester or esters are copolymerized with a malonic acid derivative having an active methylene group to produce acrylic rubber which can be cured with vulcanizing agents in the thiuram series for cross-linking.

Figure 1:
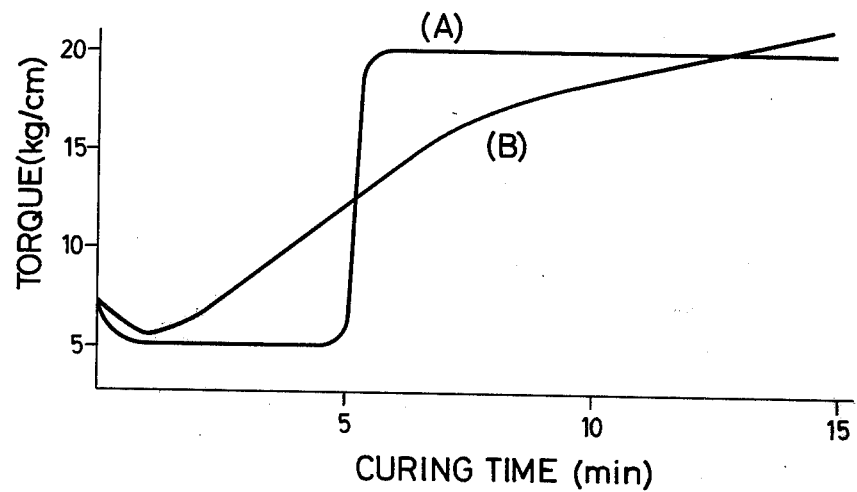
FIG. 1 is a graph showing the vulcanization curves for an acrylic rubber produced according to this invention and for the conventional acrylic rubber.

The malonic acid derivative having an active methylene group utilized in the present invention has the following general formula:

  (1)

wherein $R_1$ represents vinyl, allyl or methallyl group and X represents $COOR_2$ or cyano group.

First, if X represents $COOR_2$ in the formula (1), the malonic acid derivative has the following general formula:

  (2)

wherein $R_2$ represents methyl, ethyl or propyl group. Thus, the derivatives are malonic acids with an active methylene group having one of two acid radicals esterified with an unsaturated alcohol such as allyl alcohol, and having the other acid radical esterified with a saturated alcohol. Such derivatives include allyl ethyl malonate and allyl methyl malonate, for example.

A process for producing the former will be described by way of example. A mixture of 1 mole of ethyl cyanoacetate, 1 mole of sulfuric acid and 1 mole of water is kept at 80° C. or lower for about four hours under stirring. 1.5 mole of allyl alcohol is added, the mixture being allowed to react with slow stirring at room temperature for about 72 hours. The mixture is then rinsed, dehydrated and distilled under reduced pressure. During distillation, ethyl cyanoacetate distills off first and allyl ethyl malonate distills off last. In this process, if allyl cyanoacetate and ethyl alcohol are used as the starting materials the reaction product contains only allyl cyanoacetate and allyl ethyl malonate, containing no ethyl cyanoacetate which has a bad effect on cross-linking.

Next, if X represents cyano group in the formula (1), the malonic acid derivative has the following general formula:

  (3)

wherein $R_1$ represents vinyl, allyl or methallyl group. The malonic acid derivatives include esters of cyanoacetic acid (that is, malonic acid mononitrile) having an active methylene group with an unsaturated alcohol, such as allyl cyanoacetate or methallyl cyanoacetate, and esters thereof with hydroxyethyl acrylate or hydroxyethyl methacrylate.

Such malonic acid derivative having the general formula (3) may be produced by the conventional processes, one of which will be described by way of example. One part by weight of p-toluene sulfonic acid as a catalyzer is added to a mixture of 100 parts of cyanoacetic acid, 100 parts of allyl alcohol, 50 parts of benzene and 50 parts of cyclohexane. The mixture undergoes esterification at 70°-80° C. for about 24 hours while refluxing by means of a phase separator to remove water. After reaction, it is cooled, rinsed, dehydrated and distilled to remove the solvents. Thereafter it is further distilled under reduced pressure of 10 mmHg. The derivative aimed at is obtained by collecting the fraction at 110°-112° C.

The acrylic esters used in this invention are esters of acrylic acid with alkyl alcohols, β-ethoxy ethyl alcohol or β-methoxy ethyl alcohol.

In the copolymerization according to this invention, the amount of the malonic acid derivative having the general formula (2) or (3) is preferably 2–10% by weight, and more preferably 2–6%, relative to the acrylic ester. If it were less than 2%, the addition of malonic acid derivative would not have a sufficient effect, whereas for more than 10% the curing rate would be much higher and the tensile strength would increase owing to over-cure, but the hardness would increase, thus resulting in lower elongation and elasticity.

The reaction temperature for copolymerization is 5°-95° C., preferably 50°-70° C., and the reaction time is preferably 30 to 120 minutes.

As vulcanizing agents used for the acrylic rubber produced according to the present invention, tetramethylthiuram disulfide and tetraethylthiuram disulfide are preferable. Also, tetramethylthiuram monosulfide or thiazole is preferably used as a vulcanizing accelerator.

The acrylic rubbers produced according to the present invention show much higher curing rate and marked plateau effect in comparison with the conventional acrylic rubber cured with amines, as will be seen in FIG. 1 wherein (A) is the vulcanization curve for the acrylic rubber produced according to this invention and (B) is the curve for conventional acrylic rubber. The present acrylic rubbers also retain resistance to heat, oil, ozone, weathering and bend-cracking which the conventional acrylic rubber has. Furthermore, they have additional advantages of better processibility with a mixing roll, freedom from scorch during processing or storage, no corrosiveness to a curing mold and easy adhesion to metal inserts. Besides the present acrylic rubbers allow use of white carbon in the silica or talc series as well as the conventional carbon black as a reinforcing agent. This provides greater flexibility for production of colored rubber.

The acrylic rubber produced according to the present invention may be formed into rolls, seals, gaskets, "O"-rings, hoses and so on.

The following examples are included merely to aid in the understanding of the present invention. Unless otherwise stated, quantities are expressed as parts by weight.

EXAMPLE 1

A. In a flask were put 200 parts of water, 0.5 part of sodium laurylsulfate and 2 parts of polyoxyethylene lauryl ether as emulsifiers, 5 parts of allyl ethyl malonate, 0.05 part of potassium persulfate as polymerization initiator and 0.05 part of sodium hydrogen bisulfite as redox catalyst. The mixture was heated to 50°–70° C. while blowing nitrogen gas thereinto and 95 parts of ethyl acrylate was added drop by drop, taking 30 to 40 minutes, for emulsion polymerization to give vulcanizable acrylic rubber.

B. To 100 parts of the acrylic rubber thus prepared in (A) were added 50 parts of MEF (medium extrusion furnace) carbon, 1 part of stearic acid, 2.4 parts of tetramethylthiuram disulfide and 3.3 parts of dibenzothiazolyl disulfide. After kneading well in an open roll, the mixture was put into a curing mold and heated at 170° C. for 10 minutes. The rubber slab thus made was subjected to post cure at 150° C. for 16 hours. Table 1 summarizes the physical properties of the cured acrylic rubber in an original test, an air heat aging test at 150° C. for 70 hours and oil resistance tests, respectively.

Table 1

| Properties Kind of Test | Hardness (in HS) | Tensile strength (in kg/cm$^2$) | Elongation percentage (in %) | Volume change percentage (in %) |
|---|---|---|---|---|
| Original test | 74 | 123 | 250 | — |
| Air heat aging test at 150° C. for 70 hours | 78 | 142 | 215 | — |
| Oil resistance test with JIS No. 1 oil at 150° C. for 70 hours | 78 | 131 | 270 | — |
| with JIS No. 3 oil at 150° C. for 70 hours | 69 | 118 | 310 | — |

(JIS is an abbreviation of the Japanese Industrial Standard.)

EXAMPLE 2

Except that 4 parts of allyl methyl malonate and 96 parts of ethyl acrylate were used, the same mixing ratio and reaction conditions as in Example 1 were used to prepare vulcanizable acrylic rubber.

To 100 parts of the acrylic rubber were added 50 parts of white carbon, 1 part of stearic acid, 2.4 parts of tetraethylthiuram disulfide and 3.3 parts of dibenzothiazolyl disulfide. After kneading, the mixture was pre-cured at 170° C. for 10 minutes and post-cured at 150° C. for 4 hours. Table 2 shows the physical properties of the cured acrylic rubber measured as in Example 1.

Table 2

| Kind of test | Hardness (in HS) | Tensile strength (in kg/cm$^2$) | Elongation percentage (in %) | Volume change percentage (in %) |
|---|---|---|---|---|
| Original test | 74 | 115 | 260 | — |
| Air heat aging test at 150° C. for 70 hours | 79 | 135 | 270 | — |
| Oil resistance test with JIS No. 1 oil at 150° C. for 70 hours | 78 | 137 | 230 | −0.8 |
| with JIS No. 3 oil at 150° C. for 70 hours | 70 | 110 | 330 | +11.7 |

EXAMPLE 3

Except that 5 parts of allyl ethyl malonate, 80 parts of ethyl acrylate and 15 parts of butyl acrylate were used as monomers, the same mixing ratio and reaction conitions as in Example 1 were used. The acrylic rubber thus made was cured in the same manner as in Example 1 except that the post cure time was 7 hours. Table 3 shows the physical properties of the cured acrylic rubber.

Table 3

| Properties Kind of Test | Hardness (in HS) | Tensile strength (in kg/cm$^2$) | Elongation percentage (in %) | Volume change percentage (in %) |
|---|---|---|---|---|
| Original test | 65 | 109 | 300 | — |
| Air heat aging test at 150° C. for 70 hours | 74 | 121 | 240 | — |
| Oil resistance test with JIS No. 1 oil at 150° C. for 70 hours | 76 | 118 | 250 | +2.3 |
| with JIS No. 3 oil at 150° C. for 70 hours | 58 | 102 | 380 | +19.3 |

EXAMPLE 4

Except that 8 parts of allyl ethyl malonate and 92 parts of ethyl acrylate were used, the same mixing ratio and reaction conditions as in Example 1 were used to produce vulcanizable acrylic rubber. It was then cured as in Example 1 except that tetraethylthiuram disulfide was used instead of tetramethylthiuram disulfide. Table 4 shows the physical properties of the cured acrylic rubber.

Table 4

| Properties Kind of Test | Hardness (in HS) | Tensile strength (in kg/cm²) | Elongation percentage (in %) | Volume change percentage (in %) |
|---|---|---|---|---|
| Original test | 79 | 152 | 180 | — |
| Air heat aging test at 150° C. for 70 hours | 84 | 168 | 150 | — |
| Oil resistance test with JIS No. 1 oil at 150° C. for 70 hours | 83 | 162 | 190 | −0.9 |
| with JIS No. 3 oil at 150° C. for 70 hours | 73 | 147 | 279 | +11.8 |

EXAMPLE 5

A. In a flask were put 200 parts of water, 0.5 part of sodium laurylsulfate and 2 parts of polyoxyethylene lauryl ether, 5 parts of allyl cyanoacetate, 0.05 part of potassium persulfate and 0.05 part of sodium hydrogen bisulfite. The mixture was heated to 50°–70° C. while blowing nitrogen gas thereinto and 95 parts of ethyl acrylate was added drop by drop, taking 30 to 40 minutes, for emulsion polymerization to give vulcanizable acrylic rubber.

B. To 100 parts of the acrylic rubber thus prepared were added 50 parts of MEF carbon, 1 part of stearic acid, 2 parts of tetramethylthiuram disulfide and 2 parts of dibenzothiazolyl disulfide. After kneading well in an open roll, the mixture was put into a curing mold and heated at 170° C. for 10 minutes. The rubber slab thus made was subjected to post cure at 150° C. for 16 hours. Table 5 shows the physical properties of the cured acrylic rubber.

Table 5

| Properties Kind of Test | Hardness (in HS) | Tensile strength (in kg/cm²) | Elongation percentage (in %) | Volume change percentage (in %) |
|---|---|---|---|---|
| Original test | 75 | 145 | 260 | — |
| Air heat aging test at 150° C. for 70 hours | 79 | 142 | 226 | — |
| Oil resistance test with JIS No. 1 oil at 150° C. for 70 hours | 78 | 138 | 273 | −0.9 |
| with JIS No. 3 oil at 150° C. for 70 hours | 67 | 122 | 310 | +12.1 |

EXAMPLE 6

Except that 7 parts of allyl cyanoacetate, 15 parts of methyl acrylate and 78 parts of ethyl acrylate were used as monomers, the same mixing ratio and reaction conditions as in Example 5 were used.

To 100 parts of the acrylic rubber thus prepared were added 50 parts of white carbon as a reinforcing agent, 1 part of stearic acid, 3 parts of tetraethylthiuram disulfide and 3 parts of dibenzothiazolyl disulfide. The acrylic rubber was cured as in Example 5 except that the post cure time was 4 hours.

EXAMPLE 7

Except that 5 parts of allyl cyanoacetate, 10 parts of acrylonitrile and 85 parts of butyl acrylate were used, the same mixing ratio and reaction conditions as in Example 5 were used.

The acrylic rubber thus prepared was cured as in Example 5 except that 1.5 parts of dibenzothiazolyl disulfide were used and the post cure time was 7 hours. Table 6 shows the physical properties of the cured acrylic rubber.

Table 6

| Properties Kind of Test | Hardness (in HS) | Tensile strength (in kg/cm²) | Elongation percentage %) | Volume change (in %) |
|---|---|---|---|---|
| Original test | 70 | 135 | 210 | — |
| Air heat aging test at 150° C. for 70 hours | 75 | 162 | 206 | — |
| Oil resistance test with JIS No. 1 oil at 150° C. for 70 hours | 70 | 135 | 241 | +0.5 |
| with JIS No. 3 oil at 150° C. for 70 hours | 61 | 112 | 255 | +18.4 |

EXAMPLE 8

Except that 7 parts of allyl cyanoacetate and 93 parts of ethyl acrylate were used as monomers, the same mixing ratio and reaction conditions as in Example 5 were used.

To 100 parts of the acrylic rubber thus prepared were added 50 parts of MEF carbon, 1 part of stearic acid, 2 parts of tetraethylthiuram disulfide and 2 parts of dibenzothiazolyl disulfide. The acrylic rubber was cured as in Example 5 except that the post cure time was 4 hours.

EXAMPLE 9

The vulcanizable acrylic rubber prepared in step (A) of Example 5 was cured at 170° C. by use of such vulcanizing agent, accelerators and retarder as shown in Table 7.

Table 7

| Test No. | 1 | 2 | 3 |
|---|---|---|---|
| Acrylic rubber | 100 parts | 100 parts | 100 parts |
| MEF carbon | 50 | 50 | 50 |
| Stearic acid | 1 | 1 | 1 |
| Tetramethylthiuram disulfide | 2 | 2 | 2 |
| Dibenzothiazolyl disulfide | 2 | 2 | 2 |
| Tetramethylthiuram monosulfide | 0.5 | — | 0 |
| N-phenyl-β-naphthylamine (retarder) | — | — | 2 |

Figure 2:
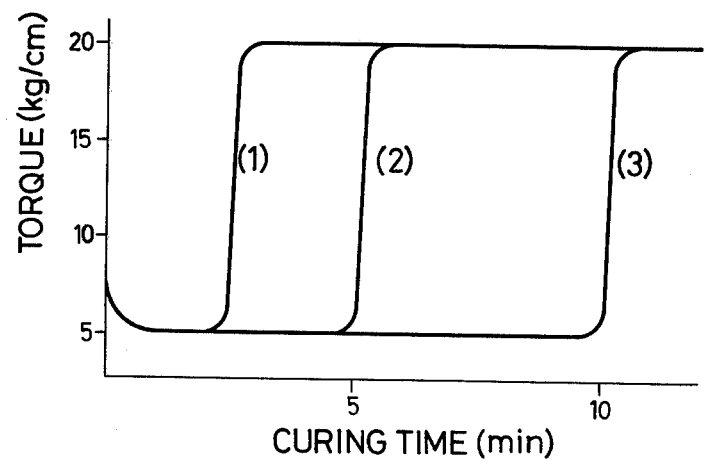
FIG. 2 is a similar graph for the acrylic rubbers prepared in Example 9.

FIG. 2 shows the vulcanization curves for these three tests. These test results show that the acrylic rubber produced according to the present invention has a large advantage over the conventional acrylic rubber in that the rise or start of vulcanization is adjustable by using a vulcanization accelerator or retarder.

What are claimed are:

1. A process for producing vulcanized acrylic rubber which comprises (1) copolymerizing (A) at least one acrylic ester selected from the group consisting of β-methoxyethylacrylate, β-ethoxyethylacrylate and an ester of acrylic acid with an alkyl alcohol with (B) 2–10% by weight, based on the weight of the acrylic ester component, of a malonic acid derivative having an active methylene group of the formula

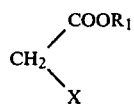

wherein $R_1$ represents vinyl, allyl or methallyl, and X represents cyano or $COOR_2$ in which $R_2$ represents methyl, ethyl or propyl, in an aqueous medium and in the presence of a copolymerization catalyst at a temperature of 5°–95° C. for 30–120 minutes, the acrylic ester component being added to the copolymerization system in a dropwise manner, and (2) vulcanizing the resultant copolymer with a vulcanizing agent of the thiuram series.

2. The process according to claim 1 wherein said malonic acid derivative is used in an amount of 2–6% by weight based on the weight of the acrylic ester component.

3. The process according to claim 1 wherein the temperature of copolymerization is 50°–70° C.

4. The process according to claim 1 wherein the vulcanizing agent is tetramethylthiuram disulfide or tetraethyl thiuram disulfide.

5. The process according to claim 1 wherein said malonic acid derivative is allyl ethyl malonate.

6. The process according to claim 1 wherein said malonic acid derivative is allyl methyl malonate.

7. The process according to claim 1 wherein said malonic acid derivative is allyl cyanoacetate.

8. The process according to claim 1 wherein said malonic acid derivative is methallyl cyanoacetate.

9. The process according to claim 1 wherein said malonic acid derivative is vinyl cyanoacetate.

* * * * *